United States Patent
Goel et al.

(10) Patent No.: US 9,860,750 B2
(45) Date of Patent: Jan. 2, 2018

(54) SYSTEMS AND METHODS OF REMOTE SUBSCRIBER IDENTITY MODULE (SIM) AUTHENTICATION

(71) Applicant: QUALCOMM Incorporated, San Diego, CA (US)

(72) Inventors: Neha Goel, Woking (GB); Anthony Lomax, Fleet (GB); Damon Mark Beales, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 15/068,886

(22) Filed: Mar. 14, 2016

(65) Prior Publication Data

US 2017/0134945 A1 May 11, 2017

Related U.S. Application Data

(60) Provisional application No. 62/253,889, filed on Nov. 11, 2015.

(51) Int. Cl.
*H04W 12/06* (2009.01)
*H04W 8/20* (2009.01)
(Continued)

(52) U.S. Cl.
CPC .......... *H04W 12/06* (2013.01); *H04W 8/205* (2013.01); *H04W 48/18* (2013.01); *H04W 76/068* (2013.01); *H04W 88/06* (2013.01)

(58) Field of Classification Search
CPC ....... H04W 12/06; H04W 8/20; H04W 76/06; H04W 48/18
(Continued)

(56) References Cited

U.S. PATENT DOCUMENTS 9,686,674 B2 * 6/2017 Lin .................... H04W 8/24
2011/0117944 A1 * 5/2011 Cao .................... H04W 48/18
455/509

(Continued)

FOREIGN PATENT DOCUMENTS

WO 2014005324 A1 1/2014

OTHER PUBLICATIONS

International Search Report and Written Opinion—PCT/US2016/061041—ISA/EPO—dated Feb. 7, 2017.

*Primary Examiner* — Nathan Taylor
(74) *Attorney, Agent, or Firm* — The Marbury Law Group, PLLC

(57) ABSTRACT

Various examples for performing remote authentication of a virtual subscriber identity module (SIM) on a multi-SIM, multi-standby communication device include receiving, on a first subscription of the multi-SIM, multi-standby communication device, an authentication request from a virtual SIM network. The multi-SIM, multi-standby communication device may respond to one or more acknowledgement requests sent from the virtual SIM network to the first subscription before tuning from the first subscription to a second subscription of the multi-SIM, multi-standby communication device to send the authentication request to a remote server. Upon receipt of the authentication response from the remote server through the second subscription, the multi-SIM, multi-standby communication device may send the authentication response to the virtual SIM network through the first subscription.

24 Claims, 8 Drawing Sheets

(51) Int. Cl.
*H04W 88/06* (2009.01)
*H04W 48/18* (2009.01)
*H04W 76/06* (2009.01)

(58) Field of Classification Search
USPC .............................................. 455/411, 435.1
See application file for complete search history.

(56) References Cited

U.S. PATENT DOCUMENTS

| | | | |
|---|---|---|---|
| 2011/0117965 A1* | 5/2011 | Gong .................... | H04W 48/18 455/558 |
| 2013/0150036 A1* | 6/2013 | Pattaswamy .......... | H04W 8/183 455/435.1 |
| 2013/0165073 A1* | 6/2013 | Madsen ................ | H04W 12/06 455/411 |
| 2013/0237197 A1* | 9/2013 | Ruvalcaba ............ | H04W 8/183 455/418 |
| 2013/0260761 A1 | 10/2013 | Walke et al. | |
| 2013/0295920 A1* | 11/2013 | Viswanadham ...... | H04W 36/14 455/426.1 |
| 2014/0120925 A1 | 5/2014 | Kanthala et al. | |
| 2015/0017950 A1* | 1/2015 | Zhao .................... | H04W 12/04 455/411 |
| 2015/0098445 A1 | 4/2015 | Chakravarthy et al. | |
| 2015/0215773 A1 | 7/2015 | Bai et al. | |
| 2015/0289314 A1 | 10/2015 | Yang et al. | |
| 2016/0323256 A1* | 11/2016 | Shahidi .................... | H04L 63/18 |
| 2017/0134945 A1* | 5/2017 | Goel ..................... | H04W 12/06 |

* cited by examiner

SYSTEMS AND METHODS OF REMOTE SUBSCRIBER IDENTITY MODULE (SIM) AUTHENTICATION

RELATED APPLICATIONS

This application claims the benefit of priority to U.S. Provisional Patent Application No. 62/253,889 entitled "Systems and Methods of Remote Subscriber Identity Module (SIM) Authentication" filed Nov. 11, 2015, the entire contents of which are incorporated herein by reference.

BACKGROUND

Current wireless communication devices may be configured to support cellular network communications using a variety of technologies and formats depending on the service provider of choice. Examples of cellular networks include Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Time Division Synchronous CDMA (TD-SCDMA), Global System for Mobile Communications (GSM), Enhanced Data rates for GSM Evolution (EDGE), GSM EDGE Radio Access Network (GERAN), and Universal Mobile Telecommunications Systems (UMTS). In order to store the provisioning data that allows the wireless communication device to communicate with a cellular communications network, wireless communication devices may utilize a subscriber identity module (SIM) provided on a smart card such as a universal integrated circuit card (UICC).

Multi-SIM wireless communication devices have become increasingly popular because of their flexibility in service options and other features. One type of multi-SIM wireless communication device, a multi-SIM, multi-standby (MSMS) device, enables multiple SIMs to be in idle mode waiting to begin communications, but allows one SIM at a time to participate in an active communication due to sharing of a single radio frequency (RF) resource (e.g., a transceiver). For example, a dual-SIM dual-standby (DSDS) device is a type of multi-SIM wireless communication device configured with one radio frequency (RF) resource and two SIMs, and typically allows selective communication on a first network through a radio access technology (RAT) while listening for pages on a second network through another RAT. Multi-SIM communication devices may allow a user to implement multiple wireless communication service subscriptions or plans with different service providers, with separate numbers and bills, on the same device (e.g., business account and personal account).

In a DSDS device, the two subscriptions share one RF resource. That means that when one subscription is active, the other subscription is idle and not using the RF resource. However, the idle subscription may periodically interrupt the active subscription to perform idle mode wakeup using the shared RF resource. This process of switching access of the shared RF resource from an active subscription to an idle subscription is sometimes referred to as a "tune-away" because the RF resource tunes away from the active subscription's frequency band or channel and tunes to the idle subscription's frequency bands or channels. After the idle subscription has finished network communications during the idle mode wakeup, access to the RF resource may tune from the idle subscription back to the active subscription (sometimes referred to herein as a "tune-back").

SUMMARY

Various examples of methods for performing remote authentication of a virtual SIM on a multi-SIM, multi-standby communication device may include receiving, on a first subscription of the multi-SIM, multi-standby communication device, an authentication request from a virtual SIM network, responding to one or more acknowledgement requests sent from the virtual SIM network to the first subscription before tuning from the first subscription to a second subscription of the multi-SIM, multi-standby communication device to send the authentication request to a remote server, and upon receipt of an authentication response from the remote server through the second subscription, sending the authentication response to the virtual SIM network through the first subscription.

In some examples, responding to one or more acknowledgement requests sent from the virtual SIM network may include introducing a delay for a predetermined amount of time between receiving the authentication request from the virtual SIM network and tuning from the first subscription to the second subscription, wherein the first subscription responds to the one or more acknowledgement requests during the delay. In some examples, the predetermined amount of time may be between 150 milliseconds and 200 milliseconds. In some examples, the predetermined amount of time may depend at least in part on relative reserved block period parameters specified by the virtual SIM network.

In some examples, responding to one or more acknowledgement requests sent from the virtual SIM network may include determining whether there are pending acknowledgement responses to the one or more acknowledgement requests, sending the pending acknowledgement responses to the virtual SIM network in response to determining that there are pending acknowledgement responses to the one or more acknowledgement requests, and tuning from the first subscription to the second subscription. In some examples, determining whether there are pending acknowledgement responses to the one or more acknowledgement requests may include using an interface established between a radio resource management layer and a radio link control layer or a medium access control layer in a protocol stack on the multi-SIM, multi-standby communication device to determine whether there are pending acknowledgement responses to the one or more acknowledgement requests.

Further examples include a multi-SIM, multi-standby communication device including a memory and a processor configured to perform operations of the methods summarized above. Further examples include a non-transitory processor-readable storage medium having stored thereon processor-executable software instructions configured to cause a processor of a multi-SIM, multi-standby communication device to perform operations of the methods summarized above. Further examples include a multi-SIM, multi-standby communication device that includes means for performing functions of the methods summarized above.

BRIEF DESCRIPTION OF THE DRAWINGS

The accompanying drawings, which are incorporated herein and constitute part of this specification, illustrate examples, and together with the general description and the detailed description given herein, serve to explain the features of the disclosed systems and methods.

DETAILED DESCRIPTION

Figure 1:
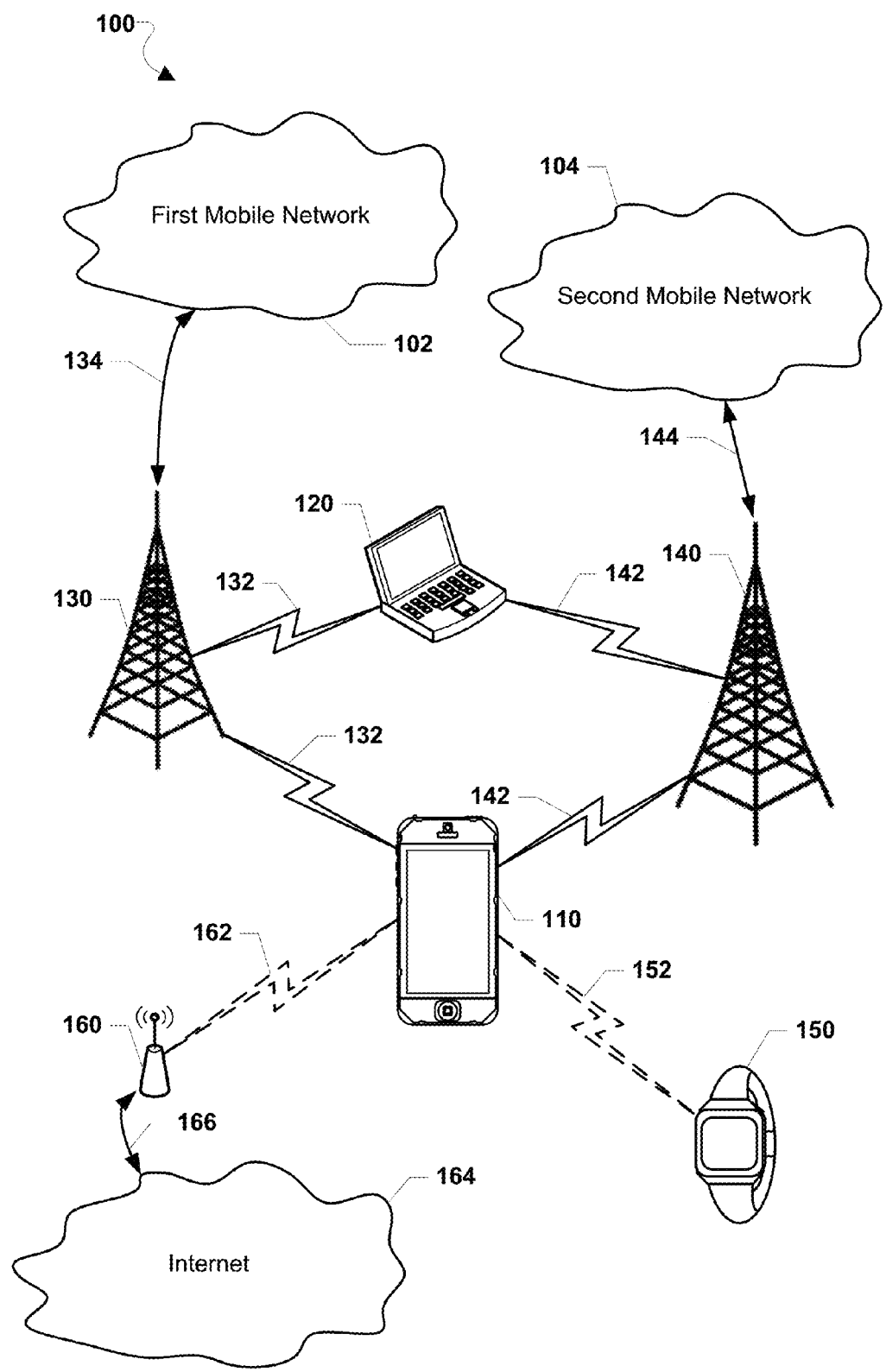
FIG. 1 is a communication system block diagram of mobile telephony networks suitable for use with various examples.

Various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the terms "multi-SIM, multi-standby communication device," "wireless communication device," and "multi-SIM device" refer to any one or all of cellular telephones, smart phones, smart watches, personal or mobile multi-media players, personal data assistants, laptop computers, tablet computers, smart books, smart watches, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least two mobile communication network with one or more shared RF resources. Various examples may be useful in wireless communication devices, such as smart phones, and so such devices are referred to in the descriptions of various examples. However, the examples may be useful in any electronic devices that may individually maintain a plurality of RATs/subscriptions that utilize at least one shared RF chain, which may include one or more of antennae, radios, transceivers, etc. Multi-SIM, multi-standby communication devices may be configured to operate in DSDS mode.

As used herein, the terms "SIM," "SIM card," and "subscriber identification module" are used interchangeably to refer to a memory that may be an integrated circuit such as an UICC or embedded into a removable card, and that stores an International Mobile Subscriber Identity (IMSI), related key, and/or other information used to identify and/or authenticate a multi-standby communication device on a network and enable a communication service with the network. Because the information stored in a SIM enables the multi-SIM, multi-standby communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

The term "server" is used herein to refer to any of a variety of commercially available computer systems configured to operate in a client-server architecture. In particular, the term "server" refers to network servers, particularly Internet or Intranet accessible servers, which typically include a processor, memory (e.g., hard disk memory), and network interface circuitry configured to connect the server processor to the network, such as the Internet or a cellular telephone network.

In the following descriptions of various examples, references made to a first subscription and a second subscription are arbitrary and used merely for the purposes of describing the examples. The multi-SIM, multi-standby communication device processor may assign any indicator, name or other designation to differentiate the subscriptions associated with one or more SIMs.

In a multi-SIM, multi-standby communication device, two or more RATs may function on the same device. For example, a multi-SIM communication device may support both LTE and GSM technologies. The multi-SIM communication device may be configured as a dual-SIM dual-standby (DSDS) device, meaning that both RATs share one RF resource and one RAT may be active at any one time, with the other RAT in the idle mode.

During travel, users of multi-SIM multi-standby communication devices may obtain and install local SIM cards in their devices in order to pay local call rates in the destination country. By using multiple SIMs, a user may take advantage of different service pricing plans and save on mobile data usage. However, users may be limited by the number of UICCs supported by the multi-SIM multi-standby communication device (e.g., a dual-SIM device supports two UICCs). Further, users may be inconvenienced by having to use different telephone numbers (e.g., MSISDNs) for different local services, as well as by the barriers to accessing personal data (e.g., a contacts list that is normally stored on a SIM) across multiple SIMs. While a user may obtain service while roaming from his or her home network operator without purchasing or installing additional SIMs, the user is often charged a fee for such service.

To overcome the costs and challenges of utilizing physical SIMs in a roaming environment, a virtual SIM (VSIM) may be implemented. A VSIM does not have to be implemented in hardware such as a UICC, but instead may be implemented in software, for example as a VSIM module stored in memory on the multi-SIM, multi-standby communication device. The VSIM module works in conjunction with a remote server that contains an actual physical SIM card. The SIM card on the server, which may be termed a remote VSIM server or network SIM server, stores a SIM profile that may be sent to the VSIM module on the multi-SIM, multi-standby communication device using the subscription supported by the device's physical SIM. Once the SIM profile is loaded in the VSIM module, the VSIM module may behave like a regular SIM card and support a subscription with a local network operator ("VSIM network").

In order to utilize a VSIM on a multi-SIM, multi-standby communication device, a VSIM application or operating system on the multi-SIM, multi-standby communication device may first obtain a VSIM profile from a remote VSIM server. The multi-SIM, multi-standby communication device may configure the VSIM module with the VSIM profile to emulate a VSIM subscription used to communicate with a VSIM network. The VSIM network sends an authentication request to the multi-SIM, multi-standby communication device over the VSIM subscription. The multi-SIM, multi-standby communication device then communicates with the remote VSIM server using the subscription associated with the physical SIM to obtain a response to the authentication request. The multi-SIM, multi-standby communication device may send the authentication response to the VSIM network, which then allows the multi-SIM, multi-standby communication device to utilize the VSIM network.

In a multi-SIM communication device, and particularly a DSDS device with two subscriptions sharing an RF resource, a first subscription (e.g., the VSIM subscription) communicates with the VSIM network to obtain the authentication request. Because the subscriptions share the RF resource in a DSDS device, the DSDS device tunes away from the VSIM subscription to the physical SIM subscription to obtain the authentication response from the remote server. This means that the multi-SIM, multi-standby communication device is not in communication with the VSIM network during the tune-away. The process implemented on a remote VSIM server to generate and send the authentication response may take a long time (depending on radio conditions, the round trip time between the multi-SIM, multi-standby communication device and the remote server, and other factors) compared to many wireless network processes and communication sequences. While the second subscription sends the authentication request to the remote server and waits for an authentication response, the first subscription and the VSIM network are not connected.

However, the connection between the VSIM network and the VSIM subscription on the multi-SIM, multi-standby communication device is subject to certain limits. For example, the VSIM network may send one or more acknowledgement requests within a relative reserved block period (RRBP) after sending the authentication request. If the multi-SIM, multi-standby communication device does not respond to the acknowledgement requests because the multi-SIM, multi-standby communication device is tuned to the physical SIM subscription communicating with the remote VSIM server, the VSIM network may declare a radio link failure and terminate the connection with the multi-SIM, multi-standby communication device through a temporary block flow (TBF) release. Temporary block flows enable packet exchanges between the multi-SIM, multi-standby communication device and the network base station in gateway general packet radio service (GPRS) networks. Typically, TBFs are short-lived because they are generally active during data transfers. The authentication process may then fail, which would cause the multi-SIM, multi-standby communication device to restart the authentication process again. It may take a multi-SIM, multi-standby communication device several tries to authenticate access with the VSIM network, and the process may take a long time. Thus in DSDS devices, the tune-away may prevent successful authentication with a VSIM network implementing conventional protocol processes.

In overview, various examples provide methods implemented with a processor of a multi-SIM multi-standby communication device for performing remote authentication of a VSIM in the device. A VSIM subscription, referred to sometimes herein as a first subscription, of the multi-SIM, multi-standby communication device, may receive an authentication request from a VSIM network. The processor may respond to one or more acknowledgement requests sent from the virtual SIM network to the first subscription before tuning from the first subscription to a second subscription (i.e., a subscription associated with a physical SIM) of the multi-SIM, multi-standby communication device to send the authentication request to a remote VSIM server. Upon receipt of an authentication response from the remote VSIM server through the second subscription, the processor may send the authentication response to the virtual SIM network through the first subscription.

Responding to the one or more acknowledgement requests sent from the virtual SIM network may include introducing a delay for a predetermined amount of time upon receiving the authentication request from the virtual SIM network before tuning from the first subscription to the second subscription, in which the first subscription responds to the one or more acknowledgement requests during the delay. The predetermined amount of time may be between 150 milliseconds and 200 milliseconds, and may depend at least in part on the RRBP parameters specified by the VSIM network.

In some examples, responding to the one or more acknowledgement requests sent from the virtual SIM network may include determining whether there are pending acknowledgement responses to the one or more acknowledgement requests and sending the pending acknowledgement responses to the virtual SIM network in response to determining that there are pending acknowledgement responses to the one or more acknowledgement requests. For example, an interface between a radio resource (RR) management layer and a radio link control (RLC) layer or a medium access control (MAC) layer in a protocol stack on the multi-SIM, multi-standby communication device may be utilized. This allows the RR layer to determine whether there are pending authentication responses in the RLC/MAC layer that should be transmitted through the first subscription before establishing a connection to the remote VSIM server through the second subscription. The multi-SIM, multi-standby communication device may then tune from the first subscription to the second subscription and complete the authentication process. Managing RF resources allocated to a multi-SIM, multi-standby communication device is done by the radio resource (RR) protocol. Methods of allocating and de-allocating radio resources are contained by the RR protocol.

Various examples may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first multi-SIM, multi-standby communication device 110 may be in communication with the first mobile network 102 through a cellular connection 132 to the first base station 130. The first multi-SIM, multi-standby communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second multi-SIM, multi-standby communication device 120 may similarly communicate with the first mobile network 102 through the cellular connection 132 to the first base station 130. The second multi-MI, multi-standby communication device 120 may also communicate with the second mobile network 104 through the cellular connection 142 to the second base station 140. The cellular connections 132 and 142 may be made through two-way wireless communication links, such as Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Time Division Synchronous CDMA (TD-SCDMA), Global System for Mobile Communications (GSM), Enhanced Data rats for GSM Evolution (EDGE), GSM EDGE Radio Access Network (GERAN), Universal Mobile Telecommunications Systems (UMTS), and other mobile telephony communication technologies.

While the multi-SIM, multi-standby communication devices 110, 120 are shown connected to the first mobile network 102 and, optionally, to the second mobile network 104, in some examples (not shown), the multi-SIM, multi-standby communication devices 110, 120 may include two or more subscriptions to two or more mobile networks and may connect to those subscriptions in a manner similar to those described herein.

In some examples, the first multi-SIM, multi-standby communication device 110 may optionally establish a wireless connection 152 with a peripheral device 150 used in connection with the first multi-SIM, multi-standby communication device 110. For example, the multi-SIM, multi-standby communication device 110 may communicate over a Bluetooth® link with a Bluetooth-enabled personal computing device (e.g., a "smart watch"). In some examples, the first multi-MI, multi-standby communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second multi-SIM, multi-standby communication device 120 may similarly be configured to connect with the peripheral device 150 and/or the wireless access point 160 over wireless links.

Figure 2:
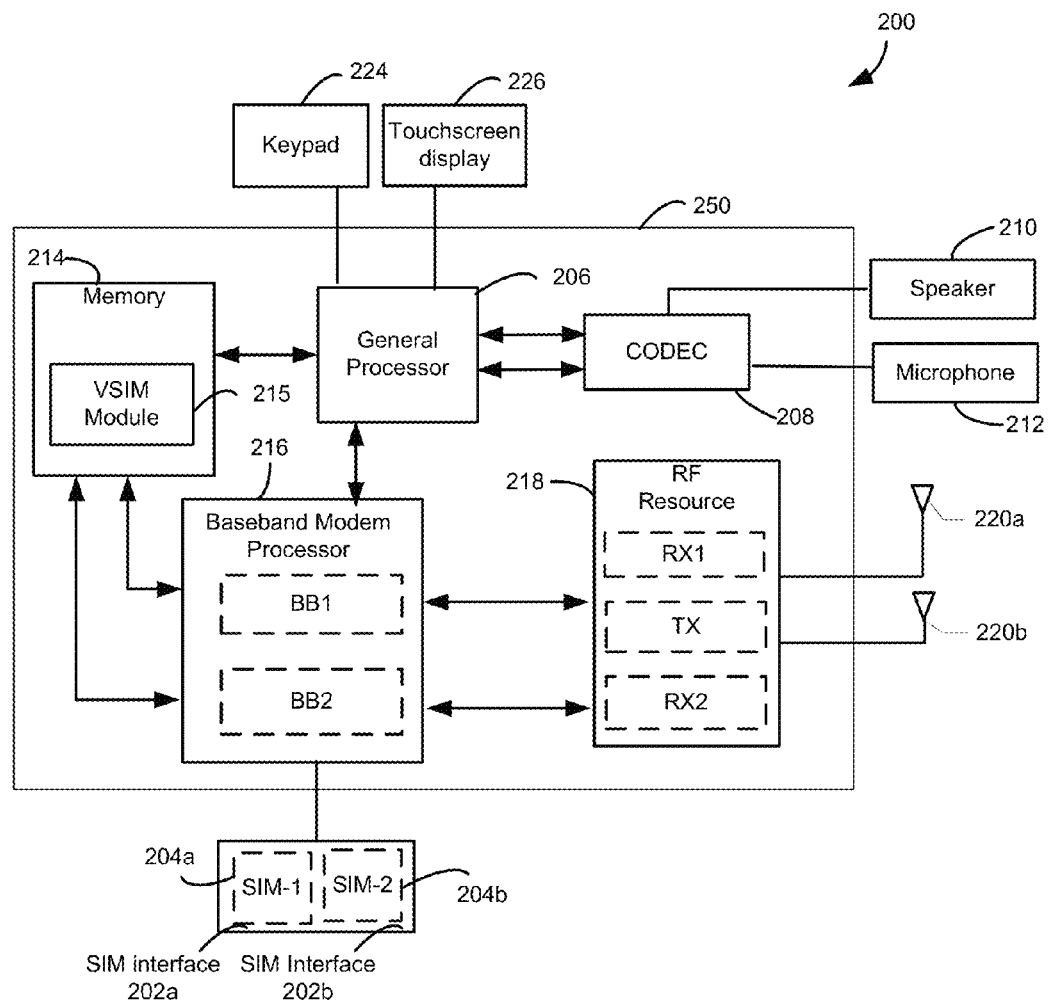
FIG. 2 is a component block diagram of a multi-SIM, multi-standby communication device according to various examples.

FIG. 2 is a functional block diagram of a multi-SIM, multi-standby communication device 200 suitable for implementing various examples. With reference to FIGS. 1-2, the multi-SIM, multi-standby communication device 200 may be similar to one or more of the multi-SIM, multi-standby communication devices 110, 120 as described. The multi-SIM, multi-standby communication device 200 may include a first SIM interface 202*a*, which may receive a first identity module SIM-1 204*a* that is associated with a first subscription. The multi-SIM, multi-standby communication device 200 may also optionally include a second SIM interface 202*b*, which may receive an optional second identity module SIM-2 204*b* that is associated with a second subscription.

A SIM in various examples may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM), an embedded UICC, or a CDMA subscriber identity module (CSIM) on a card. A SIM card may have a processor, read only memory, random access memory, programmable memory, and input/output circuits.

A SIM used in various examples may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number may be printed on the SIM card for identification. However, a SIM may be implemented within a portion of memory of the multi-SIM, multi-standby communication device 200 (e.g., in a memory 214), and thus need not be a separate or removable circuit, chip or card.

The multi-SIM, multi-standby communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain. The memory 214 may store an operating system (OS), as well as user application software and executable instructions, such as a VSIM module 215 that emulates the functionality of a physical SIM card. When the VSIM module 215 is loaded with a SIM profile provided by a remote VSIM server, the VSIM module 215 may support a VSIM subscription to connect with a VSIM network, such as a local network operator in a foreign country. The memory 214 may also store application data.

The general processor 206 and the memory 214 may each be coupled to at least one baseband modem processor 216. Each SIM and/or RAT in the multi-SIM, multi-standby communication device 200 (e.g., the SIM-1 204*a* and/or the SIM-2 204*b*) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218). In some examples, baseband-RF resource chains may share the baseband modem processor 216 (i.e., a single device that performs baseband/modem functions for all RATs on the multi-SIM, multi-standby communication device 200). In other examples, each baseband-RF resource chain may include physically or logically separate baseband processors (e.g., BB1, BB2).

The RF resource 218 may be a transceiver that performs transmit/receive functions for each of the SIMs/RATs on the multi-SIM, multi-standby communication device 200. The RF resource 218 may include separate transmit and receive circuitry, or may include a transceiver that combines transmitter and receiver functions. In some examples, the RF resource 218 may include multiple receive circuitries. The RF resource 218 may be coupled to one or more wireless antennas (e.g., wireless antennas 220*a* and 220*b*). The RF resource 218 may also be coupled to the baseband modem processor 216.

In some examples, the general processor 206, the memory 214, the baseband processor(s) 216, and the RF resource 218 may be included in the multi-SIM, multi-standby communication device 200 as a system-on-chip 250. In some examples, the first and second SIMs 204*a*, 204*b* and the corresponding interfaces 202*a*, 202*b* to each subscription may be external to the system-on-chip 250. Further, various input and output devices may be coupled to components on the system-on-chip 250, such as interfaces or controllers. Example user input components suitable for use in the multi-SIM, multi-standby communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the multi-SIM, multi-standby communication device 200 to enable communication between them, as is known in the art.

Functioning together, the two SIMs 204a, 204b, the baseband processor BB1, BB2, the RF resource 218 and the wireless antennas 220a, 220b may constitute two or more radio access technologies (RATs). For example, the multi-SIM, multi-standby communication device 200 may be a communication device that includes a SIM, baseband processor, and RF resource configured to support two different RATs, such as LTE, CDMA, WCDMA, GSM, and UMTS. More RATs may be supported on the multi-SIM, multi-standby communication device 200 by adding more SIM cards, SIM interfaces, RF resources, and antennae for connecting to additional mobile networks.

In some examples (not shown), the multi-SIM, multi-standby communication device 200 may include, among other things, additional SIM cards, SIM interfaces, a plurality of RF resources associated with the additional SIM cards, and additional antennae for supporting subscriptions communications with additional mobile networks.

A VSIM application ("VSIM app") may be implemented as processor-executable instruction executing on the general processor 206, such as a process within the operating system, to perform operations of methods of various examples. In some examples, a VSIM controller may be implemented as processor-executable instructions executing on a modem processor, such as a baseband processor BB1, BB2, to perform some operations at the modem level.

Figure 3:
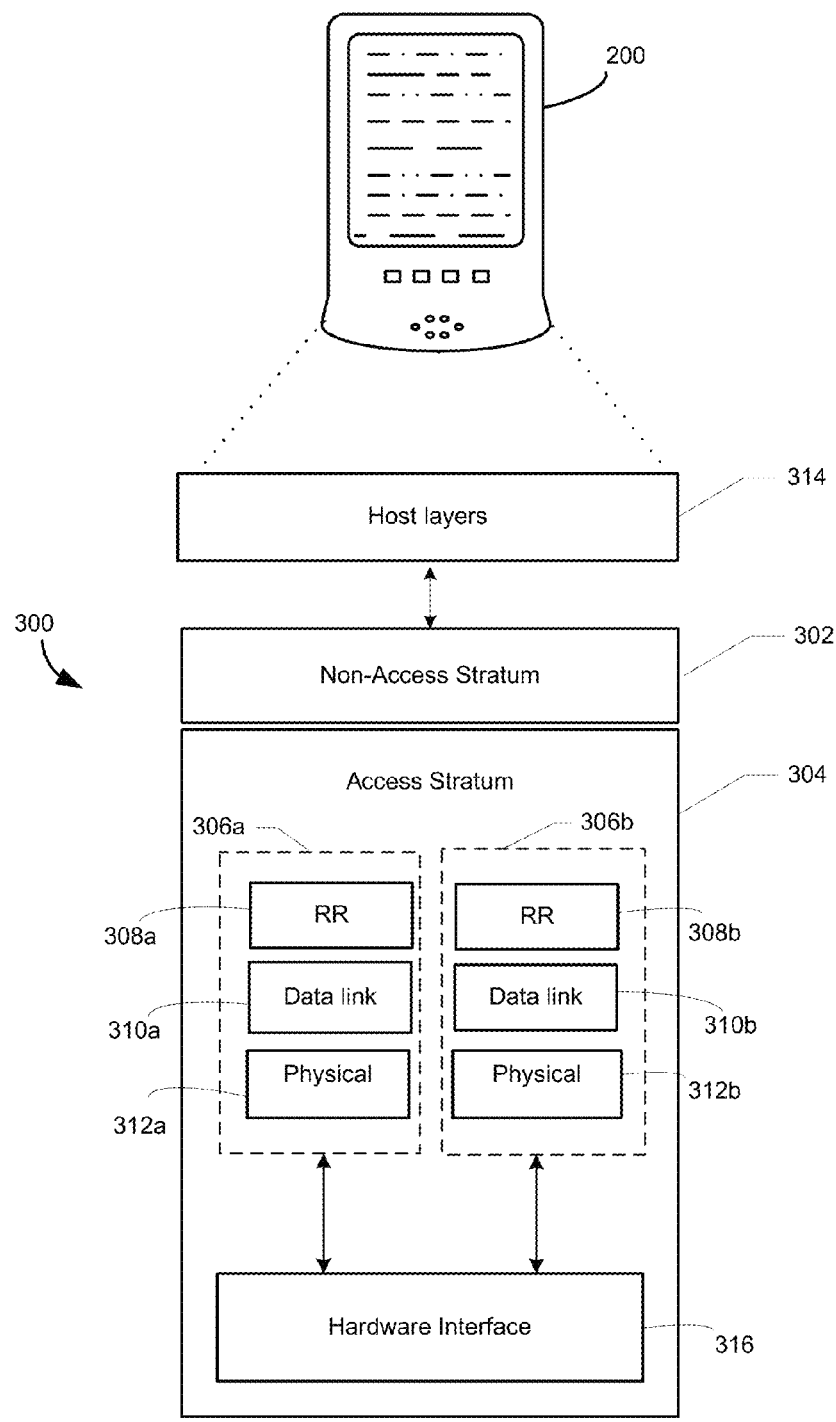
FIG. 3 is a system architecture diagram illustrating example protocol layer stacks implemented by a multi-SIM, multi-standby communication device according to various examples.

FIG. 3 illustrates an example of software architecture with layered radio protocol stacks that may be used in data communications on a multi-SIM, multi-standby communication device.

Referring to FIGS. 1-3, the multi-SIM, multi-standby communication device 200 may have a layered software architecture 300 to communicate over access networks associated with SIMs. The software architecture 300 may be distributed among one or more processors, such as baseband-modem processor 216. The software architecture 300 may also include a Non Access Stratum (NAS) 302 and an Access Stratum (AS) 304. The NAS 302 handles mobility related functions between the multi-SIM, multi-standby communication device and the core network (CN). Such functions include authentication, attach and tracking area updates, and security. It also establishes and maintains Internet protocol (IP) connectivity between the CN and the multi-SIM, multi-standby communication device. The NAS 302 may include functions and protocols to support traffic and signaling each SIM of the multi-SIM, multi-standby communication device 200 (e.g., a physical SIM/SIM-1 204a, and a VSIM) and their respective core networks. The AS 304 may include functions and protocols that support communication between each SIM (e.g., the first SIM 204a, the VSIM module 215) and entities of their respective access networks (e.g., a mobile switching center (MSC) in a GSM network, eNodeB in an LTE network, etc.).

In the multi-SIM, multi-standby communication device 200, the AS 304 may include multiple protocol stacks, each of which may be associated with a different SIM. For example, the AS 304 may include protocol stacks 306a, 306b, associated with the first SIM 204a and the VSIM module 215, respectively. Although described herein with reference to GSM-type communication layers, protocol stacks 306a, 306b may support any of variety of standards and protocols for wireless communications. In particular, the AS 304 may include at least three layers, each of which may contain various sublayers. For example, each protocol stack 306a, 306b may respectively include a Radio Resource (RR) management sublayer 308a, 308b as part of Layer 3 (L3) of the AS 304 in a GSM or LTE signaling protocol. The RR sublayers 308a, 308b may oversee the establishment of a link between the multi-SIM, multi-standby communication device 200 and associated access networks. In the various examples, the NAS 302 and RR sublayers 308a, 308b may perform the various functions to search for wireless networks and to establish, maintain and terminate calls. Further, the RR sublayers 308a, 308b may provide functions including broadcasting system information, paging, and establishing and releasing a radio resource control (RRC) signaling connection between the multi-SIM, multi-standby communication device 200 and the associated access network. While not shown, the software architecture 300 may include additional Layer 3 sublayers, as well as various upper layers above Layer 3.

Additional sub-layers may include, for example, connection management (CM) sub-layers (not shown) that route calls, select a service type, prioritize data, perform quality of service functions, etc.

Residing below the Layer 3 sublayers (RR sublayers 308a, 308b), the protocol stacks 306a, 306b may also include data link layers 310a, 310b, which may be part of Layer 2 in a GSM or LTE signaling protocol. The data link layers 310a, 310b may provide functions to handle incoming and outgoing data across the network, such as dividing output data into data frames and analyzing incoming data to ensure the data has been successfully received. In some examples, each data link layer 310a, 310b may contain various sublayers, such as a MAC sublayer, a radio link control (RLC) sublayer, and a packet data convergence protocol (PDCP) sublayer, each of which form logical connections terminating at the access network. In various examples, a PDCP sublayer may provide uplink functions including multiplexing between different radio bearers and logical channels, sequence number addition, handover data handling, integrity protection, ciphering, and header compression. In the downlink, the PDCP sublayer may provide functions that include in-sequence delivery of data packets, duplicate data packet detection, integrity validation, deciphering, and header decompression.

In the uplink, the RLC sublayer may provide segmentation and concatenation of upper layer data packets, retransmission of lost data packets, and Automatic Repeat Request (ARQ). In the downlink, the RLC sublayer functions may include reordering of data packets to compensate for out-of-order reception, reassembly of upper layer data packets, and ARQ.

In the uplink, the MAC sublayer may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

Residing below the data link layers 310a, 310b, the protocol stacks 306a, 306b may also include physical layers 312a, 312b, which may establish connections over the air interface and manage network resources for the multi-SIM, multi-standby communication device 200. In various examples, the physical layers 312a, 312b may oversee functions that enable transmission and/or reception over the air interface. Examples of such physical layer functions may include cyclic redundancy check (CRC) attachment, coding blocks, scrambling and descrambling, modulation and demodulation, signal measurements, MIMO, etc.

While the protocol stacks 306a, 306b provide functions to transmit data through physical media, the software architecture 300 may further include at least one host layer 314 to provide data transfer services to various applications in the multi-SIM, multi-standby communication device 200.

In some examples, application-specific functions provided by the at least one host layer 314 may provide an interface between the protocol stacks 306a, 306b and the general processor 206. In some examples, the protocol stacks 306a, 306b may each include one or more higher logical layers (e.g., transport, session, presentation, application, etc.) that provide host layer functions. For example, in some examples, the software architecture 300 may include a network layer (e.g., IP layer) in which a logical connection terminates at a gateway (e.g., a packet data network (PDN) access through a PDN gateway (PGW)). In some examples, the software architecture 300 may include an application layer in which a logical connection terminates at another device (e.g., end user device, server, etc.). In some examples, the software architecture 300 may further include in the AS 304 a hardware interface 316 between the physical layers 312a, 312b and the communication hardware (e.g., one or more RF resource).

In various examples, the protocol stacks 306a, 306b of the layered software architecture may be implemented to allow modem operation using information provisioned on multiple SIMs. Therefore, a protocol stack that may be executed by a baseband-modem processor is interchangeably referred to herein as a modem stack.

The modem stacks in various examples may support any of a variety of current and/or future protocols for wireless communications. For examples, the modem stacks in various examples may support networks using radio access technologies described in 3GPP standards (e.g., GSM, UMTS, LTE, etc.), 3GPP2 standards (e.g., single carrier radio transmission technology (1×RTT), CDMA2000, Evolved Data Optimized (EVDO), Ultra Mobile Broadband (UMB), etc.) and/or Institute of Electrical and Electronics Engineers (IEEE) standards Worldwide Interoperability for Microwave Access (WiMAX), Wi-Fi, etc.).

In various examples, a multi-SIM, multi-standby communication device may attach to a network associated with the first SIM/subscription (i.e., first network). The multi-SIM, multi-standby communication device may use the connection with the first network to perform normal data communication on the first subscription, as well as communicate with a subscription management system in order to acquire a VSIM profile. Once received, the VSIM profile may be loaded in the VSIM application. For example, the multi-SIM, multi-standby communication device may initiate a packet switched connection with the subscription management system on the network associated with the first subscription through the first protocol stack. The packet switched connection may involve, on the network layer of the first protocol stack, establishing a data structure. For example, for a UNITS network associated with the first subscription, the wireless device may activate a primary or secondary packet data protocol (PDP) context. In another example, for an LTE network associated with the first subscription, the wireless device may establish a default or dedicated evolved packet system (EPS) bearer. In various examples, such data structure may generally be referred to herein as a "data bearer," regardless of the particular network technology and/or communication protocol being used. In various examples, the established data bearer may provide the wireless device with access to a PGW, a gateway general packet radio service (GPRS) support node (GGSN), etc.

The subscription management system may include at least one remote server on a PDN (e.g., the Internet). The remote server(s) may be accessed on the wireless communication network associated with the first subscription (i.e., a first network) through an established PDP context or bearer. That is, the wireless device may use the established PDP context or bearer of the first network to send packets to and receive packets from at least one network entity (e.g., a remote server). In some implementations, a network entity may belong to a LTE network (e.g., an eNodeB and/or a mobility management entity (MME)). In other implementations, a network entity may belong to a universal terrestrial radio access network (UTRAN) (e.g., a nodeB). As such, connecting to at least one network entity may involve assignment of an IP bearer (e.g., a default or dedicated IP bearer) or a PDP context (e.g., a primary or secondary PDP context) by the first network. In some implementations, the remote server(s) may include a provisioning server and an associated subscription pool database. In some implementations, the provisioning server may be a subscription manager or a SIM server associated with a virtual network operator.

In various implementations, the subscription pool database may store a group of SIM profiles, or may provide access to a set of physical UICCs that are each configured with a SIM. Various components of a subscription management system may be co-located in a single physical device, and/or the functions thereof may be performed by any of a number of other components.

A number of approaches may be employed to provision the VSIM application on the multi-SIM, multi-standby communication device. The subscription management system may receive a request from the VSIM application on the wireless device for a new SIM profile, which may be triggered based on a user input. In some examples, the request received by the remote server may be automatically triggered by a condition or change on the multi-SIM, multi-standby communication device that may be detected by an application or module. Such conditions may include, for example, changes in location, differences in the services offered by various network operators (e.g., differences in type of service, cost, quality of service (QoS), etc.), user preferences (i.e., settings in the mobile device that may be sent to the provisioning server), data limits of tariff plans associated with current network operators, etc.

In various examples, the SIM profile request may be received from the wireless device in a Short Message Service (SMS) or Unstructured Supplementary Service Data (USSD) message sent over the first network.

A remote server of the subscription management system (e.g., a provisioning server) may receive the request from the VSIM application. Upon receiving the request, VSIM provisioning may proceed according to remote credential management described in the standards (for example, GSM Association, Official Document 12FAST.13 entitled "Embedded SIM Remote Provisioning Architecture), including recognizing the provisioning server as being a subscription manager. Specifically, the subscription manager (i.e., provisioning server) may select a new SIM profile from a group of SIM profiles stored in a subscription pool database associated with the subscription manager. In some examples, the selection of a new SIM profile from the subscription pool database may be based on the request from the VSIM application. In some implementations, the selection of the new SIM profile from the subscription pool database may be based, in whole or in part, on one or more internal policies of the subscription management system.

The subscription manager may utilize standard or proprietary remote credential management procedures to provision the new SIM profile as a VSIM application as the VSIM of the wireless device. Such procedures may be protected by keys that are already shared between the device (or VSIM application/module in the device) and the subscription manager. The provisioning may involve sending registration information describing a SIM profile to the mobile device on the data bearer established by the first SIM, and using the registration information to configure the VSIM application according to the described SIM profile.

In some implementations, the new SIM profile may be a set of provisioning information that includes a network operator's access algorithms and selection of data, including at least one server address (e.g., IP or universal resource locator (URL)) for the network operator, international mobile subscriber identity (IMSI), an operator controlled public land mobile network (PLMN) list, a forbidden PLMN list, and a specific authentication key (Ki or K). Once the provisioning is complete, the wireless device may use the new SIM profile by sending and receiving data through the VSIM application.

Following VSIM provisioning, the multi-SIM, multi-standby communication device may be able to operate in a dual-SIM, dual-standby configuration (or other MSMS configuration) with both a physical SIM and the VSIM (e.g., SIM profile loaded in VSIM application) set up for communication. The VSIM application may attach to the network associated with the VSIM (sometimes referred to herein as a "VSIM network"), opening another packet-switched domain between the VSIM application and that network. The communication network associated with the VSIM may send an authentication request to the device through the VSIM application. The authentication request may originate from a mobile management entity, radio network controller, or GGSN of the network, and be communicated to the multi-SIM, multi-standby communication device through a base station of the network.

The authentication request may include an authentication token (AUTN) and a random number (RAND). An authentication response may be generated from the authentication request through a calculation utilizing the AUTN, RAND, and a root key stored by the remote server. In order to perform the authentication procedure, however, the VSIM application, using the physical SIM/subscription, is granted access to the RF resource to communicate with the remote server. This means that the VSIM subscription is not in communication with the VSIM network during the authentication process.

The VSIM network may send one or more acknowledgement requests (e.g., layer 2 or L2 acknowledgement requests) to the multi-SIM, multi-standby communication device during a RRBP after sending the authentication request. However, the multi-SIM, multi-standby communication device is currently tuned to the physical subscription and not the VSIM subscription, and may not receive or be able to respond to the acknowledgement requests. If the multi-SIM, multi-standby communication device does not respond to the acknowledgement requests within the RRBP, the VSIM network may declare a radio link failure or some other time out condition and close the connection with the multi-SIM, multi-standby communication device through a TBF release. When the multi-SIM, multi-standby communication device receives an authentication response from the remote server and attempts to send the authentication response to the VSIM network, the VSIM network may reject the transmissions, resulting in an authentication failure.

The systems and methods of various examples help to prevent the VSIM network from releasing the connection to the multi-SIM, multi-standby communication device during the authentication process by ensuring that the multi-SIM, multi-standby communication device responds to at least one of the acknowledgement requests sent by the VSIM network. This may be accomplished by inserting a delay in the operations of the multi-SIM, multi-standby communication device, or establishing an interface within the protocol stack layers. These various examples are discussed in detail with reference to FIG. 4.

Figure 4:
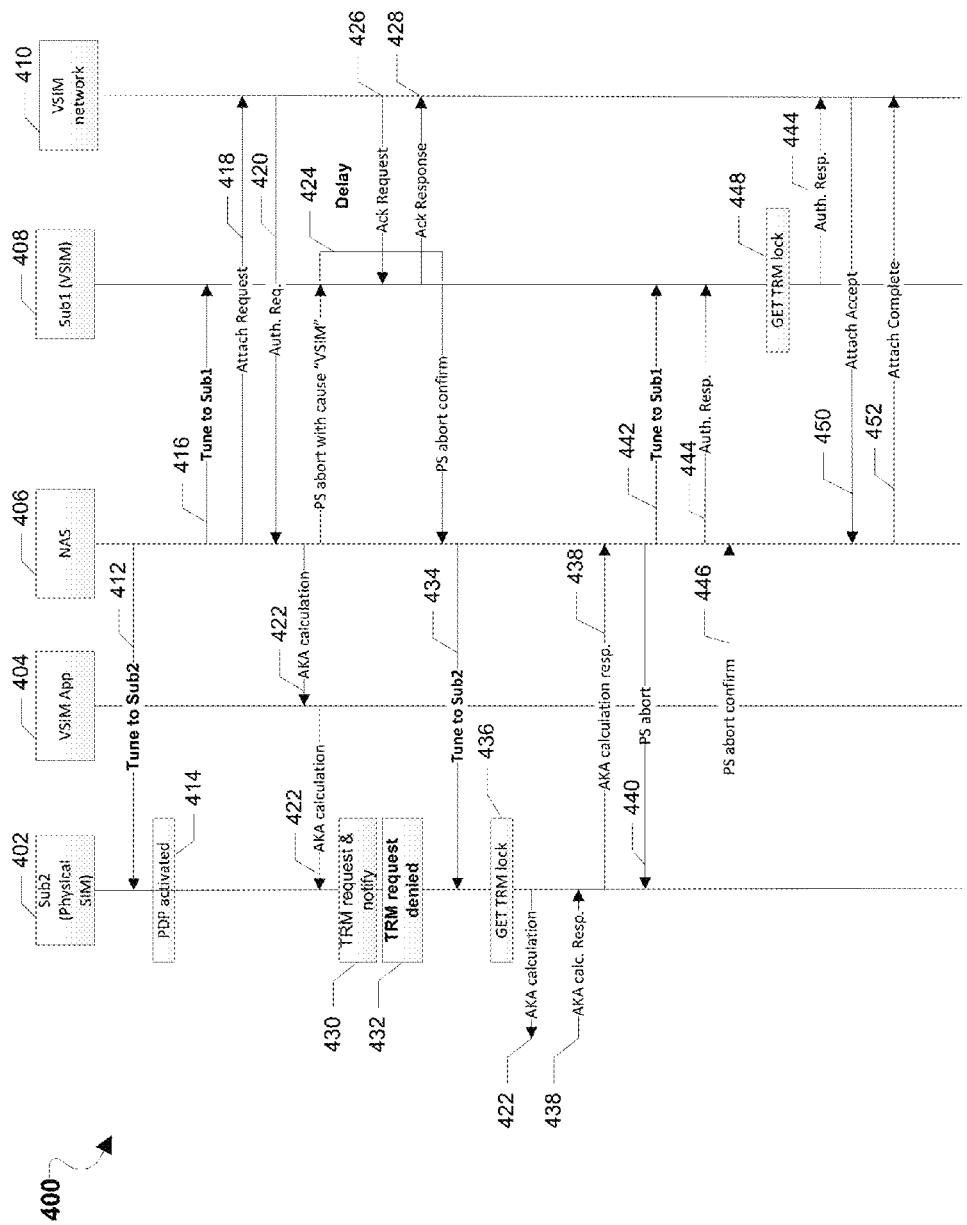
FIG. 4 is a call flow diagram illustrating an authentication process between a virtual SIM (VSIM) network, a multi-SIM, multi-standby communication device, and a remote server according to various examples.

FIG. 4 illustrates call flows 400 for an authentication process between a multi-SIM, multi-standby communication device, a VSIM network 410, and a remote VSIM server according to various examples. With reference to FIGS. 1-4, the multi-SIM, multi-standby communication device may include a first subscription 408, which may be associated with a virtual SIM configured to communicate with a VSIM network 410 through a RAT, such as LTE, CDMA, GSM, or GERAN. The multi-SIM, multi-standby communication device may include a NAS 406 that includes functions and protocols to support traffic and signaling of the subscriptions on the multi-SIM, multi-standby communication device. The multi-SIM, multi-standby communication device may include a second subscription 402, which may be associated with a physical SIM configured to communicate with a remote server using a RAT, for example GSM, GERAN, or CDMA. The multi-SIM, multi-standby communication device may be configured as a DSDS device in that the multi-SIM, multi-standby communication device may have a single RF resource shared between the first subscription 408 and the second subscription 402. The multi-SIM, multi-standby communication device may also include a VSIM application 404 for implementing VSIM functions on the multi-SIM, multi-standby communication device.

The NAS 406 may tune the shared RF resource of the multi-SIM, multi-standby communication device to the second subscription 402 in operation 412, and the second subscription 402 may perform a PDP activation to communicate with its respective network in operation 414. For example, the second subscription 402 may communicate with the remote VSIM server to receive a SIM profile in order to activate the VSIM. Upon reception of the SIM profile, the VSIM application 404 executing on the multi-SIM, multi-standby communication device may request initiation or activation of the first subscription 408. The NAS 406 may tune the RF resource to the first subscription 408 in operation 416. The first subscription 408 may send an attach request 418 to the VSIM network.

In response to the attach request 418, the VSIM network 410 may send an authentication request 420 to the multi-SIM, multi-standby communication device through the first subscription 408. The authentication request 420 may originate from a mobile management entity, radio network controller, or serving GPRS support node of the VSIM network 410.

The authentication request 420 may include an authentication token (AUTN) and a random number (RAND). An authentication response 444 may be generated from the authentication request 420 through a calculation utilizing the AUTN, RAND, and a root key stored by the remote server. The authentication request 420 may be passed to the NAS 406, which may format the authentication request 420 as an authentication and key agreement (AKA) calculation request 422 to send to the remote server. The AKA calculation request 422 may be passed to the VSIM application 404 and the second subscription 402 for transmission to the remote VSIM server.

Before tuning the RF resource from the first subscription 408 to the second subscription 402 to communicate with the remote VSIM server, the NAS 406 may introduce a delay 424 before aborting the packet switched (PS) domain attachment to the VSIM network 410. During the delay 424, the VSIM network 410 may send one or more acknowledgement requests 426 (e.g. layer 2 acknowledgement requests) to the multi-SIM, multi-standby communication device within a RRBP instituted by the VSIM network 410. The delay 424 allows the first subscription 408 to receive the acknowledgement requests 426, and to send acknowledgement responses 428. Once the VSIM network 410 receives the acknowledgement responses 428, the VSIM network 410 may no longer release the connection with the multi-SIM, multi-standby communication device during the rest of the authentication process. The delay may last for a predetermined amount of time long enough for the first subscription 408 to receive and respond to the acknowledgement requests 426. For example, the delay may last between 150 milliseconds (ms) to 200 ms, and may depend at least in part on the RRBP parameters specified by the VSIM network 410.

Alternatively, to introducing the delay 424, the multi-SIM, multi-standby communication device may utilize an interface between a RR management layer and a RLC or MAC layer in the protocol stack of the multi-SIM, multi-standby communication device. The interface may be established in the protocol stack software. The RLC or MAC layer may have received the acknowledgement requests 426 and the acknowledgement responses 428 may be pending for transmission. Normally the RR layer, which controls RF resource assignment between the first subscription 408 and the second subscription 402, may not be aware of the pending acknowledgement responses 428. However, with the interface, the RR layer may determine that there are pending acknowledgement responses 428 in the RLC/MAC layer for transmission. Thus, the RR layer may allow the acknowledgement responses 428 to be transmitted by the first subscription 408 before giving control of the RF resource to the second subscription 402.

During the delay 424, or while the RR layer is allowing transmission of pending acknowledgement responses 428 by the first subscription 408, the second subscription 402 may attempt one or more transmitter/receiver module (TRM) requests 430 to gain control of the RF resource and transmit the AKA calculation request 422. The TRM requests 430 may be denied in operation 432 while the first subscription 408 still has control of the RF resource (e.g., while the delay 424 is still ongoing or while the RR layer is allowing the acknowledgement responses 428 to be transmitted).

After the end of the delay 424, or after the RR layer allows transmission of pending acknowledgement responses 428, the NAS 406 may tune the RF resource to the second subscription 402 in operation 434. The second subscription 402 may then be able to obtain a TRM lock in operation 436. The second subscription 402 may send the AKA calculation request 422 to the remote VSIM server.

Once the remote VSIM server has calculated an AKA calculation response 438, the remote VSIM server may send the AKA calculation response 438 to the multi-SIM, multi-standby communication device through the second subscription 402. The NAS 406 may tune the RF resource back to the first subscription 408 in operation 442. The second subscription may abort the PS domain attachment with the remote VSIM server in operations 440 and 446. The AKA calculation response 438 may be converted to an authentication response 444 by the NAS 406. The first subscription 408 may obtain a TRM lock on the RF resource in operation 448 and transmit the authentication response 444 to the VSIM network 410. After the VSIM network receives and approves the authentication response 444, the NAS 406 may complete the attachment between the VSIM network 410 and the first subscription 408 in operations 450 and 452.

Figure 5A:
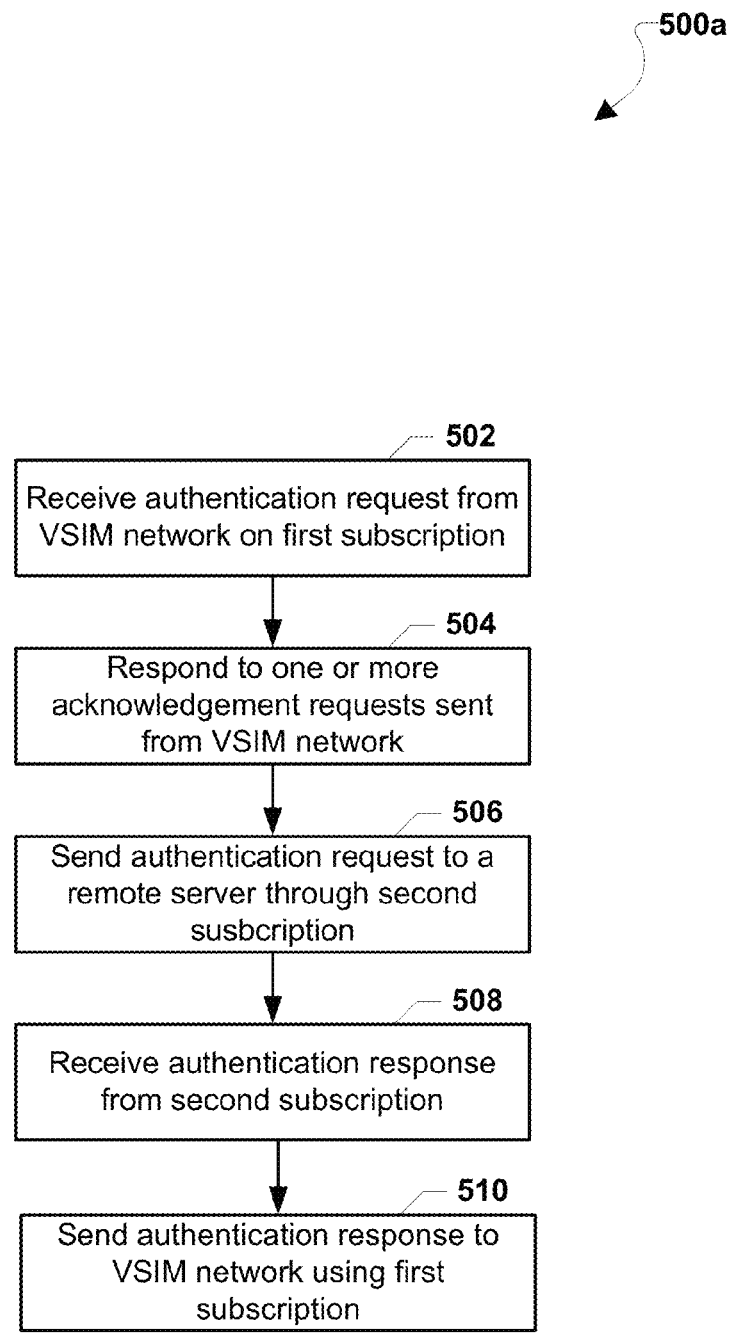
FIGS. 5A-5C are process flow diagrams illustrating methods for performing remote authentication of a VSIM on a multi-SIM, multi-standby communication device according to various examples.

FIG. 5A illustrates a method 500a for performing remote authentication of a virtual SIM on a multi-SIM, multi-standby communication device according to various examples. With reference to FIGS. 1-5, the method 500a may be implemented in processor-executable instructions executing on a processor (e.g., the general processor 206, the baseband modem processor 216, a separate controller, and/or the like) of a multi-SIM, multi-standby communication device (such as the multi-SIM, multi-standby communication devices 110, 120, 200) that supports two or more subscriptions sharing a RF resource. For example, the multi-SIM, multi-standby communication device may be a DSDS device with a first subscription associated with a virtual SIM and a second subscription associated with a physical SIM.

In block 502, the multi-SIM, multi-standby communication device processor receives an authentication request from a VSIM network over a first subscription (e.g., the VSIM subscription). Software on the multi-SIM, multi-standby communication device, such as a VSIM application or the operating system, may have previously established a connection with a remote VSIM server using the second subscription and received VSIM registration information (e.g., a packet switched communication through a GERAN network with the remote server). The VSIM registration information configures a VSIM module on the multi-SIM, multi-standby communication device to implement the first subscription to communicate with the VSIM network. The VSIM registration information may include a VSIM profile for the first subscription and a temporary identifier (e.g., an IMSI). The first subscription uses the VSIM registration information to connect to the VSIM network, which may send the authentication request to the multi-SIM, multi-standby communication device.

In block 504, the processor may respond to one or more acknowledgement requests sent from the VSIM network to the first subscription before tuning from the first subscription to the second subscription. By responding to the acknowledgement requests, the processor may prevent the VSIM network from prematurely releasing the connection with the multi-SIM, multi-standby communication device (e.g., if the multi-SIM, multi-standby communication device does not respond to L2 acknowledgement requests during a RRBP).

In some examples as described with reference to FIG. 5B, as part of the operations in block 504 the processor may introduce a delay between receiving the authentication request and tuning from the first subscription to the second subscription. The delay may last for a predetermined amount of time that long enough for the first subscription to receive and respond to the one or more acknowledgement requests. For example, the delay may last between 150 milliseconds (ms) to 200 ms, and may depend at least in part on the RRBP parameters specified by the VSIM network.

In some examples as described with reference to FIG. 5C, as part of the operations in block 504 the processor may use an interface between a RR management layer and a RLC or MAC layer in the protocol stack of the multi-SIM, multi-standby communication device. The RLC or MAC layer may have buffered pending acknowledgement responses for the one or more acknowledgement requests. Providing the interface may enable the RR layer to determine that there are pending acknowledgement responses in the RLC/MAC layer for transmission. Thus, in such examples the RR layer may allow the acknowledgement responses to be transmitted by the first subscription before giving control of the RF resource to the second subscription, thereby introducing a delay without using a predetermined amount of delay time or using a delay timer.

In block 506, the processor may perform a tune-away from the first subscription to the second subscription to send the authentication request to the remote server. The authentication request may include an authentication token (AUTN) and a random number (RAND) and the processor may convert the authentication request into an AKA calculation request to be sent to the remote server. The remote server may store a root key that allows the remote server to calculate an authentication response from the authentication request.

In block 508, the processor may receive an authentication response from the remote server through the second subscription. The authentication response received from the remote server may be formatted as an AKA calculation response and the processor may convert the AKA calculation response into another format to generate the authentication response.

In block 510, the processor may tune the RF resource from the second subscription to the first subscription and send the authentication response to the VSIM network through the first subscription. In this manner, the method 500a provides a way to increase the success rate for authenticating a VSIM on a multi-SIM, multi-standby communication device.

Figure 5B:
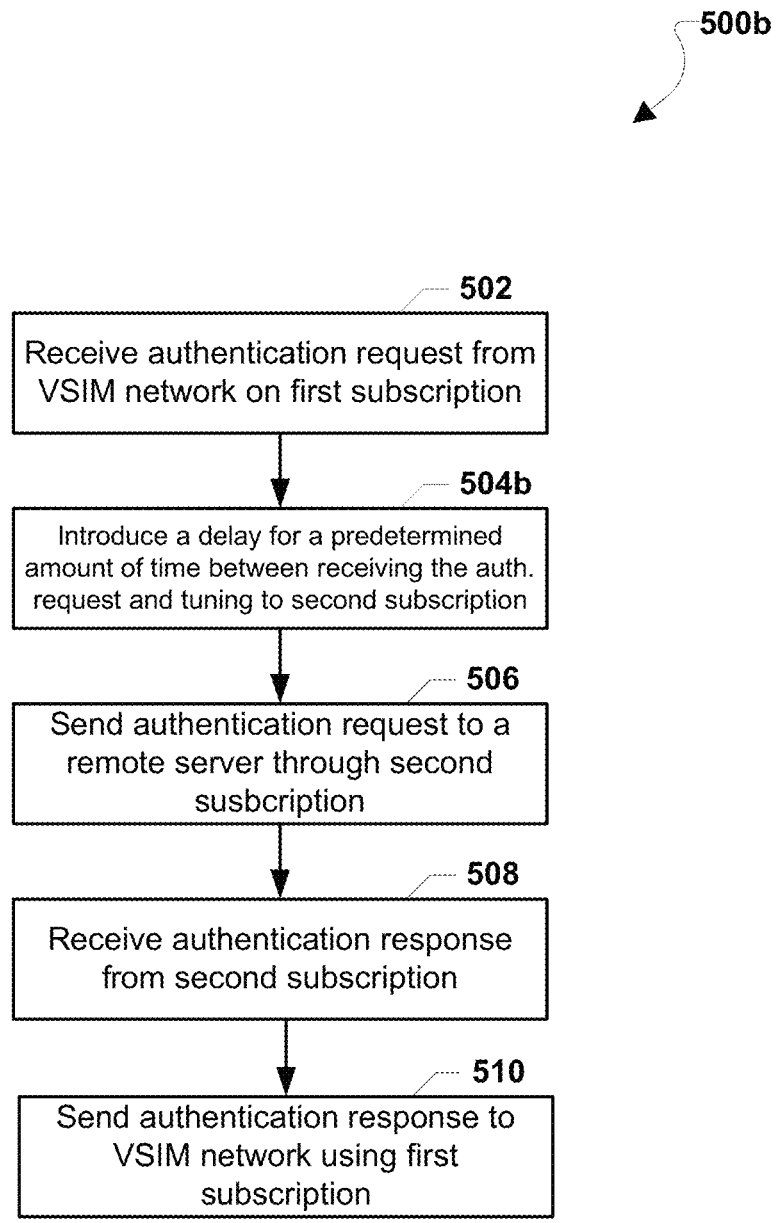

FIG. 5B illustrates a method 500b for performing remote authentication of a virtual SIM on a multi-SIM, multi-standby communication device according to various examples. With reference to FIGS. 1-5B, the method 500b may be implemented in processor-executable instructions executing on a processor (e.g., the general processor 206, the baseband modem processor 216, a separate controller, and/or the like) of a multi-SIM, multi-standby communication device (such as the multi-SIM, multi-standby communication devices 110, 120, 200) that supports two or more subscriptions sharing a RF resource. For example, the multi-SIM, multi-standby communication device may be a DSDS device with a first subscription associated with a virtual SIM and a second subscription associated with a physical SIM.

In the method 500b, the multi-SIM, multi-standby communication device processor may perform operations of blocks 502 and 506-510 as described for like numbered blocks of the method 500a. In block 504b, the processor may introduce a delay between receiving the authentication request and tuning from the first subscription to the second subscription. The delay may last for a predetermined amount of time that long enough for the first subscription to receive and respond to the one or more acknowledgement requests. For example, the delay may last between 150 milliseconds (ms) to 200 ms, and may depend at least in part on the RRBP parameters specified by the VSIM network. By introducing the delay, the processor may prevent the VSIM network from prematurely releasing the connection with the multi-SIM, multi-standby communication device (e.g., if the multi-SIM, multi-standby communication device does not respond to L2 acknowledgement requests during a RRBP).

Figure 5C:
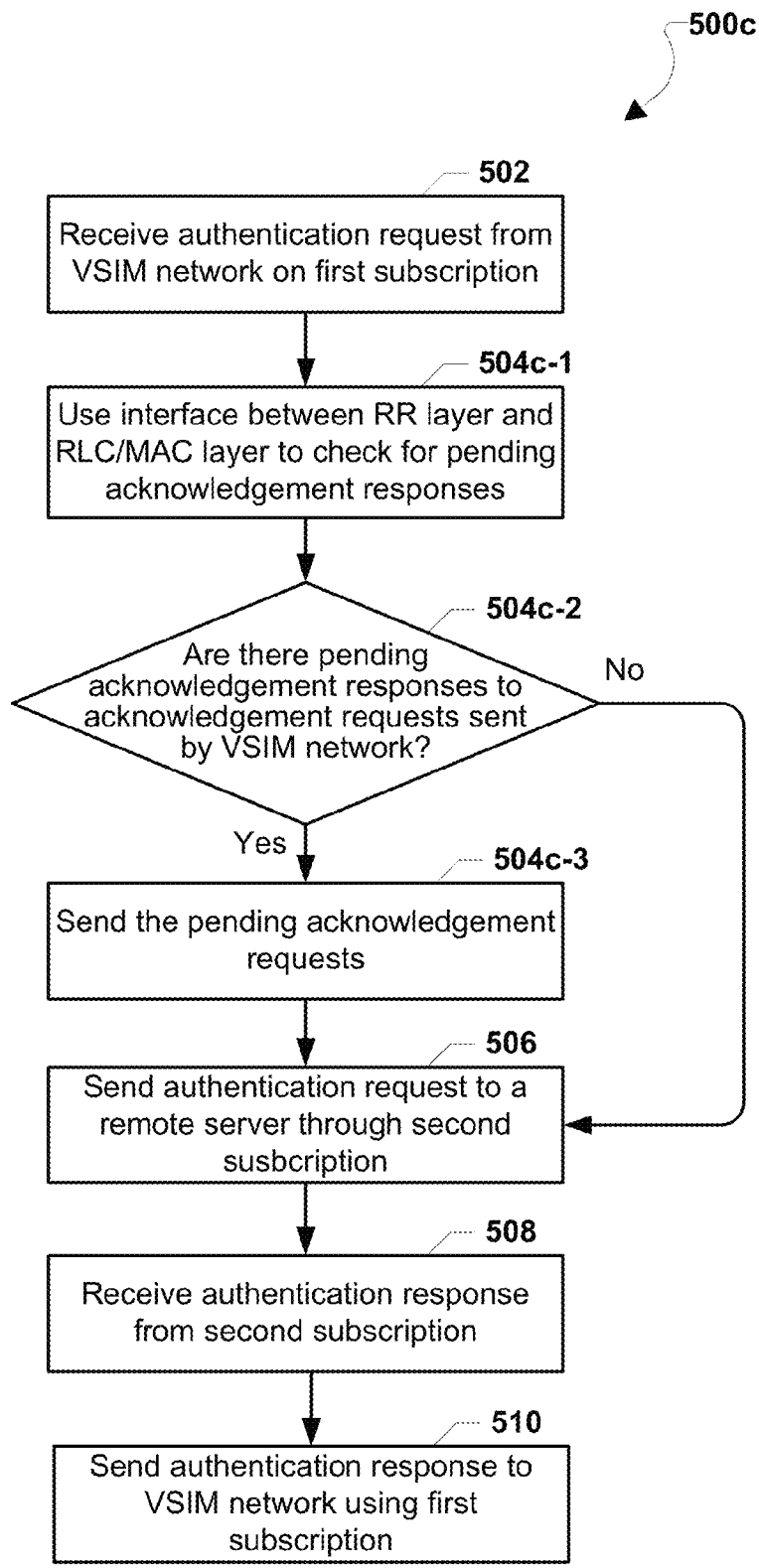

FIG. 5C illustrates a method 500c for performing remote authentication of a virtual SIM on a multi-SIM, multi-standby communication device according to various examples. With reference to FIGS. 1-5C, the method 500c may be implemented in processor-executable instructions executing on a processor (e.g., the general processor 206, the baseband modem processor 216, a separate controller, and/or the like) of a multi-SIM, multi-standby communication device (such as the multi-SIM, multi-standby communication devices 110, 120, 200) that supports two or more subscriptions sharing a RF resource. For example, the multi-SIM, multi-standby communication device may be a DSDS device with a first subscription associated with a virtual SIM and a second subscription associated with a physical SIM.

In the method 500c, the multi-SIM, multi-standby communication device processor may perform operations of blocks 502 and 506-510 as described for like numbered blocks of the method 500a.

In block 504c-1, the processor may use an interface that is established between a RR management layer and a RLC or MAC layer in the protocol stack of the multi-SIM, multi-standby communication device. The RLC or MAC layer may have buffered pending acknowledgement responses for the one or more acknowledgement requests. Using the interface may enable the RR layer to determine that there are pending acknowledgement responses in the RLC/MAC layer for transmission. The interface may be added to the protocol stack software of the multi-SIM, multi-standby communication device if it does not already exist. If the interface already exists, the interface may be altered to include messaging between the RR layer and the RLC/MAC layer indicating pending acknowledgement responses.

In determination block 504c-2, the processor may determine whether there are any pending acknowledgement responses to one or more acknowledgement requests sent by the VSIM network. In response to determining that there are pending acknowledgement responses (i.e., determination block 504c-2="Yes"), the processor may send the acknowledgement responses to the VSIM network in block 504c-3. By responding to the acknowledgement requests, the processor may prevent the VSIM network from prematurely releasing the connection with the multi-SIM, multi-standby communication device (e.g., if the multi-SIM, multi-standby communication device does not respond to L2 acknowledgement requests during a RRBP). Thus, the RR layer may allow the acknowledgement responses to be transmitted by the first subscription before giving control of the RF resource to the second subscription, thereby introducing a delay without using a predetermined amount of delay time or using a delay timer.

In response to determining that there are no pending acknowledgement responses (i.e., determination block 504c-2="No"), or after sending any pending acknowledgement responses in block 504c-3, the processor may perform a tune-away from the first subscription to the second subscription to send the authentication request to the remote server in block 506 as described for the like numbered block in the method 500a (FIG. 5A).

Figure 6:
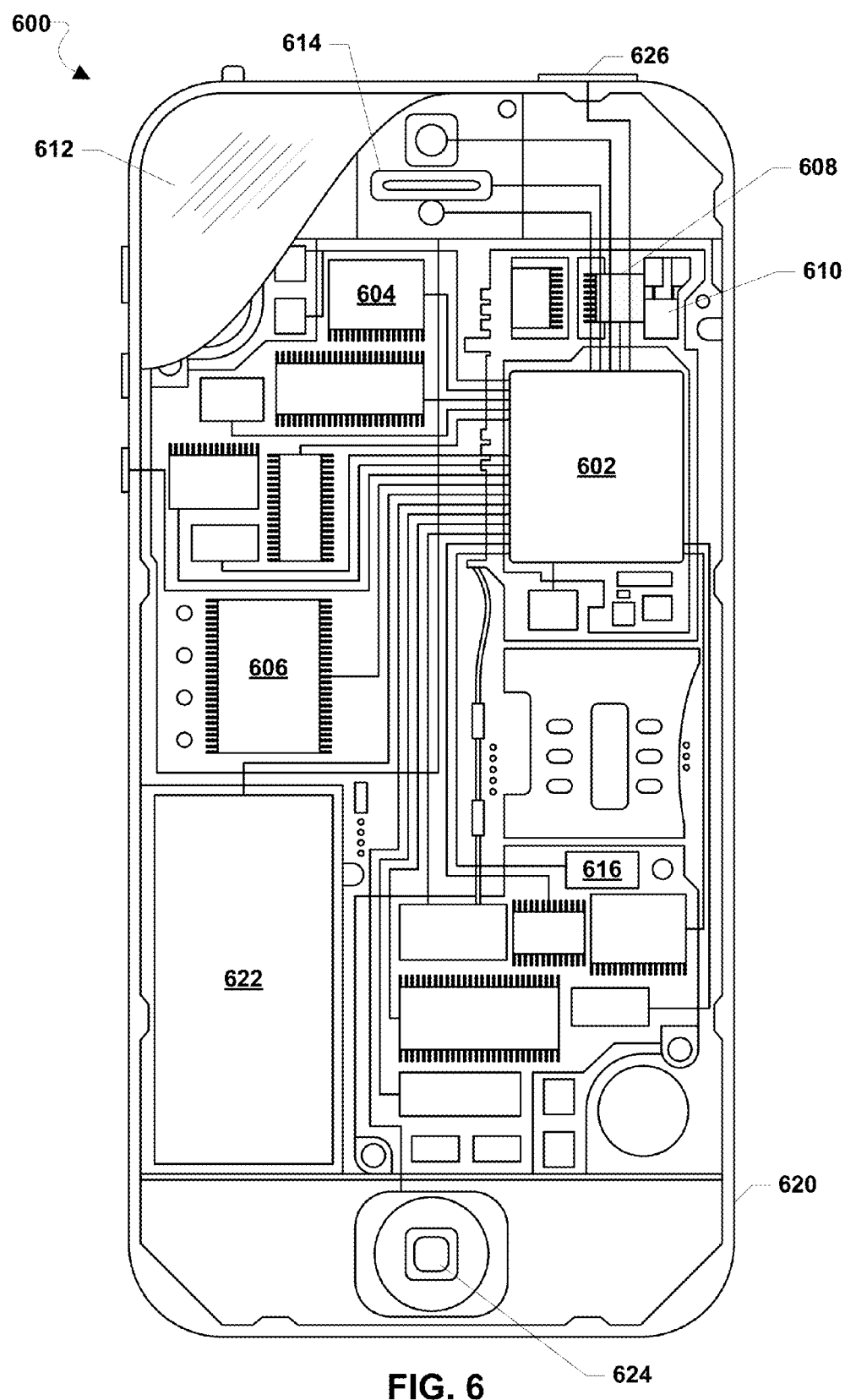
FIG. 6 is a component block diagram of a multi-SIM, multi-standby communication device suitable for implementing some example methods.

Various examples may be implemented in any of a variety of multi-SIM, multi-standby communication devices, an example of which (e.g., multi-SIM, multi-standby communication device 600) is illustrated in FIG. 6. According to various examples, the multi-SIM, multi-standby communication device 600 may be similar to the multi-SIM, multi-standby communication devices 110, 120 as described with reference to FIG. 1, as well as the multi-SIM, multi-standby communication device 200 as described with reference to FIG. 2. As such, the multi-SIM, multi-standby communication device 600 may implement the methods 500a, 500b, and 500c in FIGS. 5A-5C.

With reference to FIGS. 1-6, the multi-SIM, multi-standby communication device 600 may include a processor 602 coupled to a touchscreen controller 604 and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the multi-SIM, multi-standby communication device 600 need not have touch screen capability.

The multi-SIM, multi-standby communication device 600 may have one or more cellular network transceivers 608 coupled to the processor 602 and to one or more antennas 610 and configured for sending and receiving cellular communications. The one or more transceivers 608 and the one or more antennas 610 may be used with the herein-mentioned circuitry to implement methods according to various examples. The multi-SIM, multi-standby communication device 600 may include one or more SIM cards 616 coupled to the one or more transceivers 608 and/or the processor 602, and may be configured as described herein.

The multi-SIM, multi-standby communication device 600 may also include speakers 614 for providing audio outputs. The multi-SIM, multi-standby communication device 600 may also include a housing 620, constructed of a plastic, metal, or a combination of materials, for containing all or some of the components discussed herein. The multi-SIM, multi-standby communication device 600 may include a power source 622 coupled to the processor 602, such as a disposable or rechargeable battery. The rechargeable battery may also be coupled to the peripheral device connection port to receive a charging current from a source external to the multi-SIM, multi-standby communication device 600. The multi-SIM, multi-standby communication device 600 may also include a physical button 624 for receiving user inputs. The multi-SIM, multi-standby communication device 600 may also include a power button 626 for turning the multi-SIM, multi-standby communication device 600 on and off.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations. Alternatively, some steps or methods may be performed by circuitry that is specific to a given function.

In one or more examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the claims. Various modifications to these examples will be readily apparent to those skilled in the art, and the generic principles defined herein may be applied to some examples without departing from the scope of the claims. Thus, the present disclosure is not intended to be limited to the examples shown herein but is to be accorded the widest scope consistent with the following claims and the principles and novel features disclosed herein.

What is claimed is:

1. A method for performing remote authentication of a virtual subscriber identity module (SIM) on a multi-SIM, multi-standby communication device, comprising:
   receiving on a first subscription of the multi-SIM, multi-standby communication device an authentication request from a virtual SIM network;
   receiving on the first subscription one or more acknowledgement requests sent from the virtual SIM network;
   responding to the one or more acknowledgement requests sent from the virtual SIM network to the first subscription before tuning from the first subscription to a second subscription of the multi-SIM, multi-standby communication device to send the authentication request to a remote server; and
   upon receipt of an authentication response from the remote server through the second subscription, sending the authentication response to the virtual SIM network through the first subscription.

2. The method of claim 1, wherein responding to one or more acknowledgement requests sent from the virtual SIM network comprises:
   introducing a delay for a predetermined amount of time between receiving the authentication request from the virtual SIM network and tuning from the first subscription to the second subscription, wherein the first subscription responds to the one or more acknowledgement requests during the delay.

3. The method of claim 2, wherein the predetermined amount of time is between 150 milliseconds and 200 milliseconds.

4. The method of claim 2, wherein the predetermined amount of time depends at least in part on relative reserved block period parameters specified by the virtual SIM network.

5. The method of claim 1, wherein responding to one or more acknowledgement requests sent from the virtual SIM network comprises:
   determining whether acknowledgement responses to the one or more acknowledgement requests are pending;
   sending the pending acknowledgement responses to the virtual SIM network in response to determining that acknowledgement responses to the one or more acknowledgement requests are pending; and
   tuning from the first subscription to the second subscription.

6. The method of claim 5, wherein determining whether acknowledgement responses to the one or more acknowledgement requests are pending comprises using an interface established between a radio resource management layer and a radio link control layer or a medium access control layer in a protocol stack on the multi-SIM, multi-standby communication device to determine whether acknowledgement responses to the one or more acknowledgement requests are pending.

7. A multi subscriber identity module (SIM), multi-standby communication device, comprising:
   a memory;
   a radio frequency (RF) resource; and
   a processor coupled to the memory and the RF resource, configured to connect to a virtual SIM associated with a first subscription and a physical SIM associated with a second subscription, and configured to:
      receive on the first subscription an authentication request from a virtual SIM network;
      receive on the first subscription one or more acknowledgement requests sent from the virtual SIM network;
      respond to the one or more acknowledgement requests sent from the virtual SIM network to the first subscription before tuning from the first subscription to the second subscription to send the authentication request to a remote server; and
      upon receipt of an authentication response from the remote server through the second subscription, send the authentication response to the virtual SIM network through the first subscription.

8. The multi-SIM, multi-standby communication device of claim 7, wherein the processor is further configured to respond to one or more acknowledgement requests sent from the virtual SIM network by:
   introducing a delay for a predetermined amount of time between receiving the authentication request from the virtual SIM network and tuning from the first subscription to the second subscription, wherein the first subscription responds to the one or more acknowledgement requests during the delay.

9. The multi-SIM, multi-standby communication device of claim 8, wherein the predetermined amount of time is between 150 milliseconds and 200 milliseconds.

10. The multi-SIM, multi-standby communication device of claim 8, wherein the predetermined amount of time depends at least in part on relative reserved block period parameters specified by the virtual SIM network.

11. The multi-SIM, multi-standby communication device of claim 7, wherein the processor is further configured to respond to one or more acknowledgement requests sent from the virtual SIM network by:
   determining whether acknowledgement responses to the one or more acknowledgement requests are pending;
   sending the pending acknowledgement responses to the virtual SIM network in response to determining that acknowledgement responses to the one or more acknowledgement requests are pending; and
   tuning from the first subscription to the second subscription.

12. The multi-SIM, multi-standby communication device of claim 11, wherein the processor is further configured to determine whether acknowledgement responses to the one or more acknowledgement requests are pending by:
   using an interface established between a radio resource management layer and a radio link control layer or a medium access control layer in a protocol stack on the multi-SIM, multi-standby communication device to determine whether acknowledgement responses to the one or more acknowledgement requests are pending.

13. A non-transitory computer readable storage medium having stored thereon processor-executable software instructions configured to cause a processor of a multi subscriber identity module (SIM), multi-standby communication device to perform operations comprising:
  receiving on a first subscription of the multi-SIM, multi-standby communication device an authentication request from a virtual SIM network;
  receiving on the first subscription one or more acknowledgement requests sent from the virtual SIM network;
  responding to the one or more acknowledgement requests sent from the virtual SIM network to the first subscription before tuning from the first subscription to a second subscription of the multi-SIM, multi-standby communication device to send the authentication request to a remote server; and
  upon receipt of an authentication response from the remote server through the second subscription, sending the authentication response to the virtual SIM network through the first subscription.

14. The non-transitory computer readable storage medium of claim 13, wherein the stored processor-executable instructions are configured to cause the processor to perform operations such that responding to one or more acknowledgement requests sent from the virtual SIM network comprises:
  introducing a delay for a predetermined amount of time between receiving the authentication request from the virtual SIM network and tuning from the first subscription to the second subscription, wherein the first subscription responds to the one or more acknowledgement requests during the delay.

15. The non-transitory computer readable storage medium of claim 14, wherein the predetermined amount of time is between 150 milliseconds and 200 milliseconds.

16. The non-transitory computer readable storage medium of claim 14, wherein the predetermined amount of time depends at least in part on relative reserved block period parameters specified by the virtual SIM network.

17. The non-transitory computer readable storage medium of claim 13, wherein the stored processor-executable instructions are configured to cause the processor to perform operations such that responding to one or more acknowledgement requests sent from the virtual SIM network comprises:
  determining whether acknowledgement responses to the one or more acknowledgement requests are pending;
  sending the pending acknowledgement responses to the virtual SIM network in response to determining that acknowledgement responses to the one or more acknowledgement requests are pending; and
  tuning from the first subscription to the second subscription.

18. The non-transitory computer readable storage medium of claim 17, wherein the stored processor-executable instructions are configured to cause the processor to perform operations such that determining whether acknowledgement responses to the one or more acknowledgement requests are pending comprises:
  using an interface established between a radio resource management layer and a radio link control layer or a medium access control layer in a protocol stack on the multi-SIM, multi-standby communication device to determine whether acknowledgement responses to the one or more acknowledgement requests are pending.

19. A multi subscriber identity module (SIM), multi-standby communication device, comprising:
  means for receiving on a first subscription of the multi-SIM, multi-standby communication device an authentication request from a virtual SIM network;
  means for receiving on the first subscription one or more acknowledgement requests sent from the virtual SIM network;
  means for responding to the one or more acknowledgement requests sent from the virtual SIM network to the first subscription before tuning from the first subscription to a second subscription of the multi-SIM, multi-standby communication device to send the authentication request to a remote server; and
  means for sending an authentication response to the virtual SIM network through the first subscription upon receipt of the authentication response from the remote server through the second subscription.

20. The multi-SIM, multi-standby communication device of claim 19, wherein means for responding to one or more acknowledgement requests sent from the virtual SIM network comprises:
  means for introducing a delay for a predetermined amount of time between receiving the authentication request from the virtual SIM network and tuning from the first subscription to the second subscription, wherein the first subscription responds to the one or more acknowledgement requests during the delay.

21. The multi-SIM, multi-standby communication device of claim 20, wherein the predetermined amount of time is between 150 milliseconds and 200 milliseconds.

22. The multi-SIM, multi-standby communication device of claim 20, wherein the predetermined amount of time depends at least in part on relative reserved block period parameters specified by the virtual SIM network.

23. The multi-SIM, multi-standby communication device of claim 19, wherein means for responding to one or more acknowledgement requests sent from the virtual SIM network comprises:
  means for determining whether acknowledgement responses to the one or more acknowledgement requests are pending;
  means for sending the pending acknowledgement responses to the virtual SIM network in response to determining that acknowledgement responses to the one or more acknowledgement requests are pending; and
  means for tuning from the first subscription to the second subscription.

24. The multi-SIM, multi-standby communication device of claim 23, wherein means for determining whether acknowledgement responses to the one or more acknowledgement requests comprises:
  means for using an interface established between a radio resource management layer and a radio link control layer or a medium access control layer in a protocol stack on the multi-SIM, multi-standby communication device to determine whether acknowledgement responses to the one or more acknowledgement requests are pending.

* * * * *